(12) United States Patent
Ogata et al.

(10) Patent No.: US 11,069,897 B2
(45) Date of Patent: Jul. 20, 2021

(54) VOLUME-EXPANSION ACCOMMODABLE ANODE-FREE SOLID-STATE BATTERY

(71) Applicant: TeraWatt Technology Inc., Santa Clara, CA (US)

(72) Inventors: Ken Ogata, Kanagawa (JP); Yang Yang, Kanagawa (JP); Hajime Hoshi, Kanagawa (JP); Masatsugu Nakano, Kanagawa (JP); Hiroshi Imoto, Kanagawa (JP)

(73) Assignee: TeraWatt Technology Inc., Santa Clara, CA (US)

( * ) Notice: Subject to any disclaimer, the term of this patent is extended or adjusted under 35 U.S.C. 154(b) by 193 days.

(21) Appl. No.: 16/414,748

(22) Filed: May 16, 2019

(65) Prior Publication Data

US 2020/0365903 A1 Nov. 19, 2020

(51) Int. Cl.
*H01M 4/62* (2006.01)
*H01M 4/66* (2006.01)
*H01M 10/0525* (2010.01)
*H01M 10/0587* (2010.01)

(52) U.S. Cl.
CPC ......... *H01M 4/628* (2013.01); *H01M 4/661* (2013.01); *H01M 10/0525* (2013.01); *H01M 10/0587* (2013.01)

(58) Field of Classification Search
CPC .. H01M 4/628; H01M 4/661; H01M 10/0525; H01M 10/0587; H01M 2300/0065-0082

USPC .......................................................... 429/94
See application file for complete search history.

(56) References Cited

U.S. PATENT DOCUMENTS

| | | | |
|---|---|---|---|
| 2014/0017552 A1 | 1/2014 | Wang et al. | |
| 2016/0043384 A1* | 2/2016 | Zhamu | H01M 4/366 |
| | | | 429/231.4 |
| 2016/0226070 A1 | 8/2016 | Lopatin et al. | |
| 2016/0261000 A1* | 9/2016 | Zhang | H01M 4/661 |
| 2017/0338465 A1 | 11/2017 | Holme et al. | |
| 2018/0233297 A1* | 8/2018 | Zhamu | H01G 11/84 |
| 2018/0287197 A1 | 10/2018 | Luo et al. | |
| 2018/0287410 A1* | 10/2018 | de Souza | H01M 10/0585 |
| 2019/0067732 A1* | 2/2019 | Zhamu | C01G 53/50 |

FOREIGN PATENT DOCUMENTS

WO 2020/146446 A1 7/2020

* cited by examiner

*Primary Examiner* — James M Erwin
(74) *Attorney, Agent, or Firm* — Kilpatrick Townsend & Stockton LLP

(57) ABSTRACT

Various arrangements of an anode-free solid-state battery cell are presented herein. The battery cell can include a lithium ion buffer layer that is located between a solid-state electrolyte and an anode current collector. Lithium ions may be stored within the lithium ion buffer layer when the battery cell is charged, which can decrease an amount of swelling within the battery cell.

20 Claims, 4 Drawing Sheets

VOLUME-EXPANSION ACCOMMODABLE ANODE-FREE SOLID-STATE BATTERY

BACKGROUND

Anode-free solid-state battery cells with a high energy density and/or high power density tend to swell when charged. During charging, ions, such as lithium ions, migrate from a battery's cathode to the battery's anode through the battery's electrolyte. For anode-free solid-state batteries, the anode current collector effectively functions as both the anode and the current collector. When the battery cell is charged, ions may plate at the battery's anode current collector and occupy a substantial amount of volume. The plating of these ions at the anode current collector may cause the battery cell to swell. This swelling can cause significant problems. For instance, the swelling can cause pressure to be exerted within the battery cell, potentially degrading components with the battery cell. This swelling may degrade the anode current collector over time, causing it to fracture, crack, or break apart; thus degrading the performance of the battery cell.

SUMMARY

Various arrangements of an anode-free solid-state battery cell are presented herein. The battery cell may include a cathode current collector layer. The battery cell may include a cathode that is layered with the cathode current collector layer. The battery cell may include a solid-state electrolyte layer. The battery cell may include a lithium ion buffer layer. The solid-state electrolyte layer can be located between the cathode and the lithium ion buffer layer. The lithium ion buffer layer can be porous. The lithium ion buffer layer can be in direct contact with the solid-state electrolyte layer. Lithium ions can be stored within the lithium ion buffer layer when the anode-free solid-state battery cell is charged. An anode current collector may be in direct contact with the lithium ion buffer layer.

Embodiments of such an anode-free solid-state battery cell may include one or more of the following features: The lithium ion buffer layer can be electrically conductive and sufficiently flexible for the anode-free solid-state battery cell to be rolled into a jelly-roll style battery cell. The anode current collector may be a copper foil layer. A cylindrical battery cell housing may be present. The cathode current collector layer, the cathode, the solid-state electrolyte layer, the lithium ion buffer layer, and the anode current collector can be rolled together to form a jell-roll style anode-free solid-state battery cell and inserted within the cylindrical battery cell housing. The lithium ion buffer layer may be less than 20 µm thick. The lithium ion buffer layer may be graphite. The anode-free solid-state battery cell can have a power density of at least 1000 Watt-hours per liter. The anode-free solid-state battery cell can have an energy density of at least 400 Watt-hours per kilogram. When the anode-free solid-state battery cell is fully charged, at least 80% of the lithium ions that have migrated to toward the anode current collector through the solid-state electrolyte layer may be stored within the lithium ion buffer layer. The porosity of the lithium ion buffer layer may be greater than 70%.

DETAILED DESCRIPTION

In order to increase the life of an anode-free solid-state battery cell, the amount of swelling that occurs during charge cycles may be decreased. By decreasing the amount of swelling, components within the battery cell may degrade at a slower rate over charge and discharge cycles. For instance, if a copper foil is used as both the anode and anode current collector in an anode-free solid-state battery (SSB), the copper foil may be prone to cracking due to one or more cycles during which the battery cell has swelled. Further, in a jelly-roll style battery, since the layers of the battery cell may be rolled together, the amount of swelling may be exacerbated since within the jelly-roll, the battery cell layers may repeat multiple times.

In order to decrease the amount of swelling, a porous buffer layer may be created between the anode current collector and the solid-state electrolyte. The buffer layer may need to meet several requirements, including being: electrically conductive, flexible, thin, and sufficiently porous to admit lithium ions. The buffer layer may function as a scaffolding that provides "storage" for lithium ions when the battery cell is charged. Rather than the majority of lithium ions plating directly onto the anode current collector and causing swelling between the anode current collector and solid-state electrolyte, lithium ions may plate or otherwise be stored within the porous structure of the buffer layer. The buffer layer may be sufficiently porous that voids are present to accommodate lithium ions migrating toward the anode current collector during charging. By the ions filling these pre-existing voids, swelling is largely avoided. During discharge, when lithium ions migrate toward the cathode through the solid-state electrolyte, the voids within the buffer material become empty again. Therefore, the volume of the buffer material, and the battery cell as a whole, may exhibit less swelling due to charge and discharge cycles when the buffer layer is present.

Figure 1:
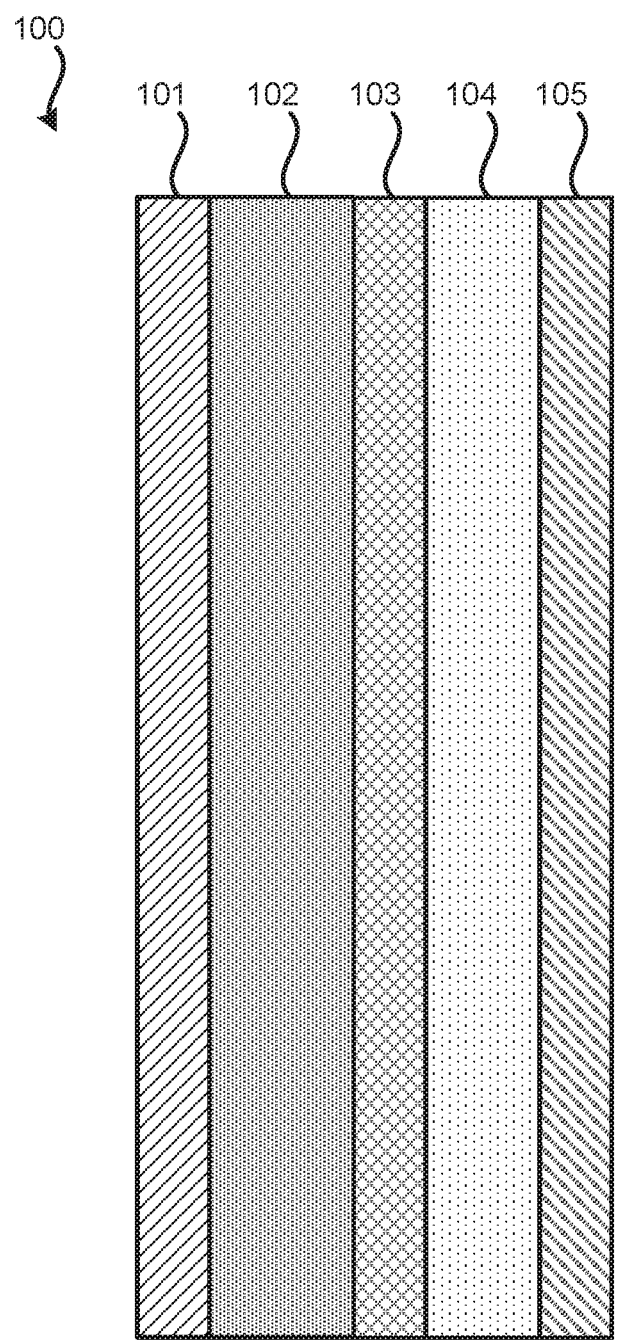
FIG. 1 illustrates an embodiment of a battery cell that includes a buffer layer to structure store lithium ions.

Further detail of such embodiments is provided in reference to the figures. FIG. 1 illustrates an embodiment of a battery cell 100 that includes a buffer layer to structure store lithium ions. Battery cell 100 may be a solid-state battery cell. Further, battery cell 100 may be an anode-free battery cell, meaning that the anode current collector functions as both the current collector and anode. Battery cell 100 may include: cathode current collector 101; cathode layer 102; solid-state electrolyte layer 103; buffer layer 104; and anode current collector 105. Such a battery cell may be designed to have a power density of at least 1000 Watt-hours per liter and/or an energy density of at least 400 Watt-hours per kilogram.

Battery cell 100 may be created by layers 101-105 being layered together then rolled into a "jelly-roll" style battery cell. Once rolled, a cylindrical housing may be used to house the rolled layers of battery cell 100. Since battery cell 100 may be rolled, layers 101-105 may need to be flexible such that damage to layers 101-105 does not result from the layers being rolled. Further, reducing swelling in a jelly-roll style battery cell may be particularly beneficial since the battery cell's layers are rolled together: any swelling that occurs can compound since the layers of the battery cell repeat multiple times within the jelly-roll.

Cathode current collector 101 and anode current collector 105 may be materials that are conductive and will exhibit electrochemical stability. Cathode current collector 101 may be a metallic layer that is conductive and is non-reactive with cathode layer 102 and is stable at the operating potential of cathode layer 102. For instance, cathode current collector 101 may be composed of aluminum. Typically, a thin foil of aluminum may be used. Similarly, anode current collector 105 may be a metallic layer that is conductive, non-reactive with buffer layer 104, and stable at the operating potential at which anode current collector 105 will function (as the anode of battery cell). For instance, anode current collector 105 may be composed of copper. Typically, a thin foil of copper may be used.

Cathode layer 102 can be in direct contact with cathode current collector 101. Cathode layer 102 may be various types of cathode material. For example, cathode layer 102 may be Lithium Nickel Cobalt Aluminium Oxide ("NCA", $LiNiCoAlO_2$). Other Nickel-based cathodes may also be possible, such as NCM622, NCM811, and OLO.

Solid-state electrolyte layer 103 may in direct contact with cathode layer 102. Solid-state electrolyte layer 103 may be various forms of organic or inorganic solid-state electrolyte. Possible electrolytes that can be used include: LPS, LSPSC, LGPS, LBSO, LATSPO, LISICON, LICGC, LAGP, LLZO, LZO, LAGTP, LiBETI, LiBOB, LiTf, LiTF, LLTO, LLZP, LTASP, LTZP.

Between solid-state electrolyte layer 103 and anode current collector 105 can be lithium-ion buffer layer 104. Buffer layer 104 may be: electrically conductive, flexible, and have a high porosity. Buffer layer 104 may be between 100 nm and 30 µm thick. In some embodiments, the preferable thickness of buffer layer 104 may be 5 µm. Specifically, the thickness of buffer layer 104 may be selected to not substantially increase the volume or weight of battery cell 100. Specifically, the thicker buffer layer 104 is, the lower the energy and power density of battery cell 100 may be. Therefore, a thickness of buffer layer 104 may be selected to achieve a balance between energy/power density and ability to avoid swelling.

Buffer layer 104 may have a high porosity, such as between 5% and 90%. In some embodiments, the porosity may be greater than 70%. The voids within buffer layer 104 may help accommodate lithium ions that migrate to anode current collector 105 during charging. That is, the lithium ions fill in the voids within the buffer layer 104 when battery cell 100 is charging and is charged. Preferably, 50%-95% of lithium ions that migrate toward anode current collector 105 during charging will remain within buffer layer 104. The remaining 5%-50% or less than 5%-50% will either plate between buffer layer 104 and anode current collector 105 or will reside or plate between solid-state electrolyte layer 103 and buffer layer 104.

Buffer layer 104 may be sufficiently flexible such that when battery cell 100 is rolled into a jelly-roll, no or only limited damage occurs to buffer layer 104. Specifically, a strong electrical and physical interface between the material (e.g., copper) of anode current collector 105 and buffer layer 104 is required to remain present.

Materials that have a sufficient amount of porosity, electrical conductivity, flexibility, and ability to interface with copper can include: graphene, carbon black, acetylene black (AB), and ketjen black (KB). These materials can be bound by one of the following binders: SBR-CMC, LiPAA, PvDF. The carbon may be in the form of fibers (i.e., carbon fibers) or in flake form. Other forms of carbon or other materials may be used as buffer layer 104 if such materials. When battery cell 100 is manufactured, buffer layer 104 may be deposited onto anode current collector 105.

Figure 2:
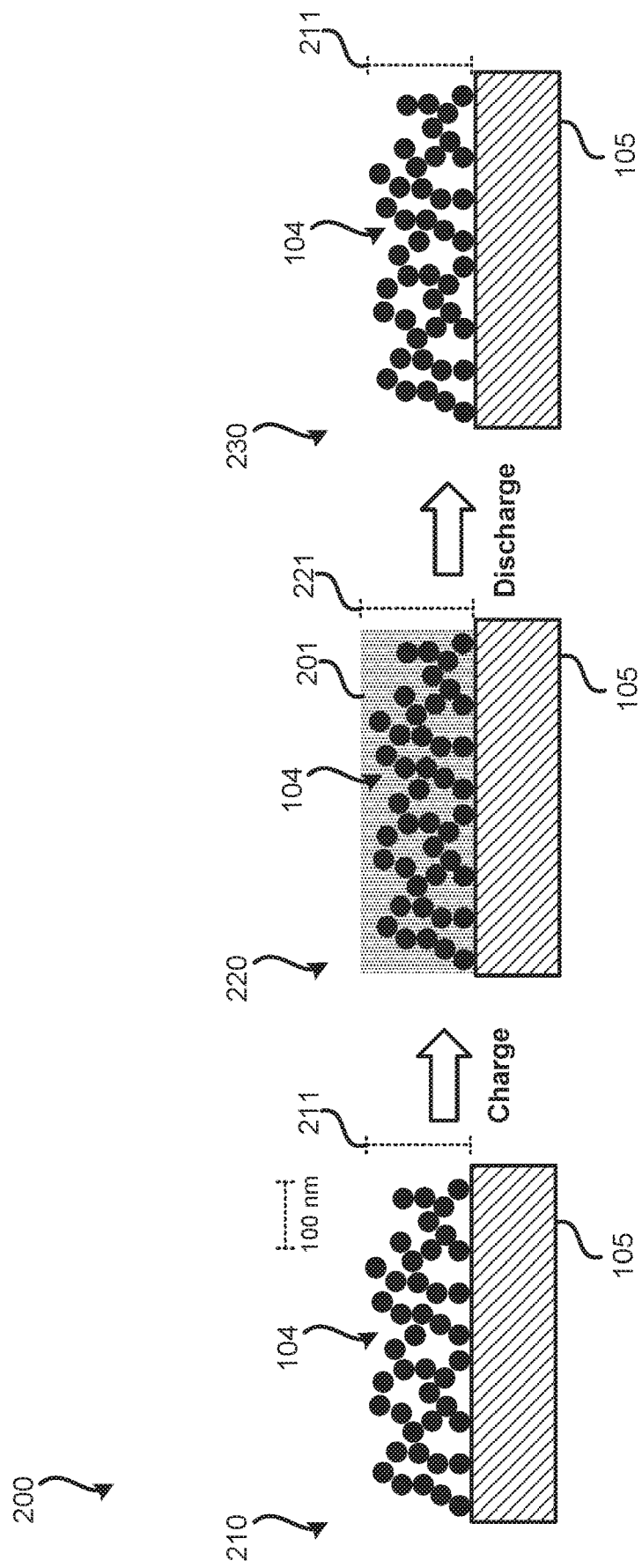
FIG. 2 illustrates an embodiment of a charge and discharge cycle showing lithium plating when a buffer layer structures the lithium plating.

FIG. 2 illustrates an embodiment 200 of a charge and discharge cycle showing lithium ion storage when a buffer layer is present against the anode current collector. In embodiment 200, only a portion of battery cell 100 is illustrated. In embodiment 200, anode current collector 105 and a highly-magnified representation of buffer layer 104 is illustrated.

In uncharged state 210, buffer layer 104 is present with few, if any, lithium ions residing in the voids formed by the particles of buffer layer 104. In this illustrated embodiment, buffer layer 104 is approximately 200 nm thick, as indicated by thickness 211. When charging occurs, as shown in charged state 220, lithium ions 201 fill in the voids formed by the particles of buffer layer 104. Therefore, lithium ions still plate directly only anode current collector 105, but the volume of the lithium ions are present mostly within the voids formed by the particles of buffer layer 104. In the illustrated embodiment, a small amount of swelling has occurred due to the plating of lithium ions. Thickness 221 is approximately 3%-10% greater than thickness 211 because the amount of lithium ions exceeds the amount of space within the voids of buffer layer 104. In other embodiments, buffer layer 104 may be made thicker to fully accommodate or nearly fully accommodate the lithium ions when the battery cell is fully charged.

After discharge, the lithium ions migrate away from anode current collector 105 toward the cathode. The swelling caused by the lithium ions plating subsides and the thickness of buffer layer 104 returns to approximately thickness 211. The amount of swelling when buffer layer 104 is present may be significantly less than if buffer layer 104 was not present and lithium ions were permitted to plate on anode current collector 105 without a porous buffer being present.

Figure 3:
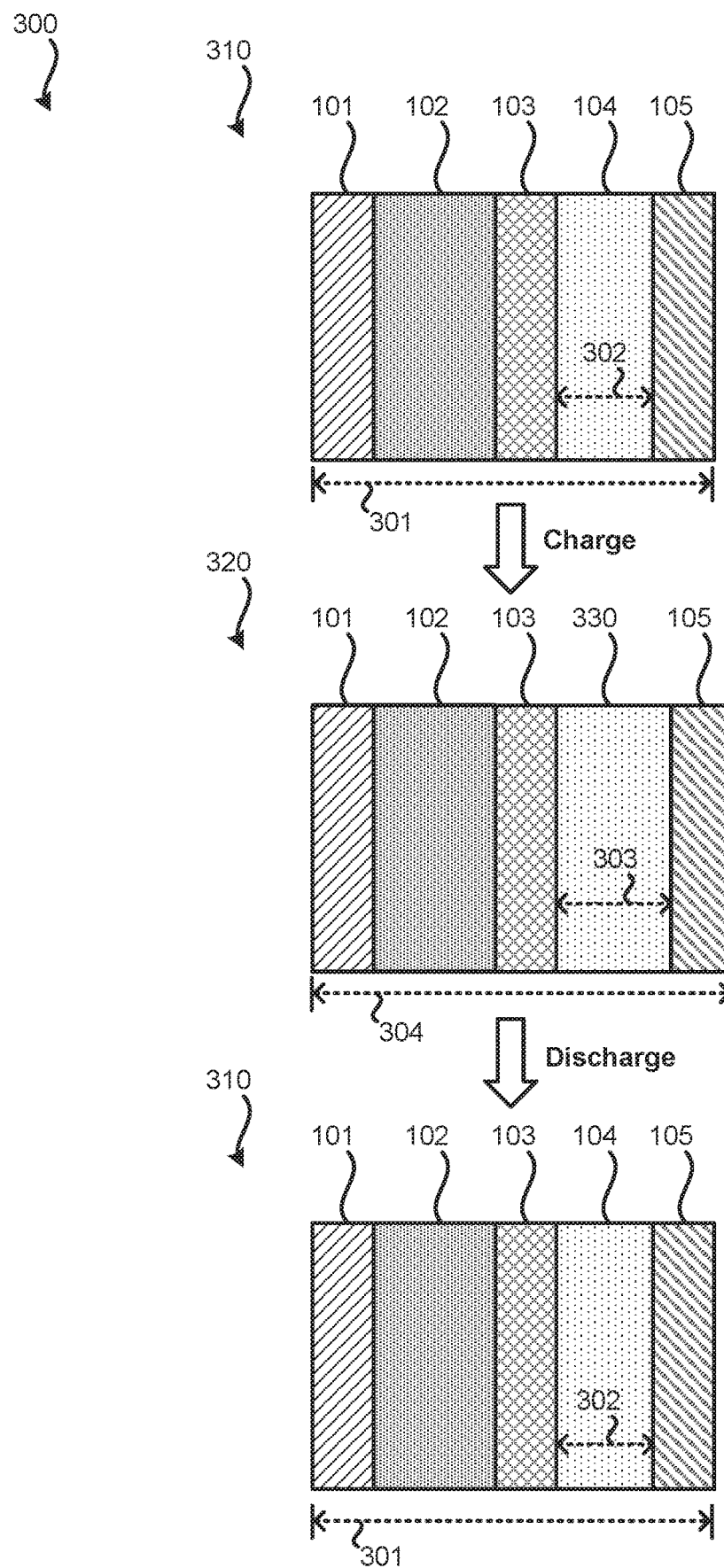
FIG. 3 illustrates an embodiment of a charge and discharge cycle for a cross-section of a solid-state battery having a buffer layer to store lithium ions.

FIG. 3 illustrates an embodiment 300 of charge and discharge cycles for a cross-section of a solid-state battery having a buffer layer to store lithium ions.

In discharged state 310, buffer layer 104 is present with few, if any, lithium ions residing in the voids formed by the particles of buffer layer 104. Thickness 302 represents a baseline thickness that does not include any swelling caused by the plating of lithium ions. Similarly, thickness 301 represents a baseline thickness for the battery cell when swelling is not present. When charging occurs, as shown in charged state 320, lithium ions fill in the voids formed by the particles of the buffer layer, thus creating layer 330 that includes buffer layer 104 and lithium plating. Thickness 303 may be slightly greater than thickness 302 due to the lithium plating causing some amount of swelling. Thickness 303 may be approximately 3%-10% greater than thickness 302 because the amount of lithium ions exceeds the amount of space within the voids of buffer layer 104. Similarly, thickness 302 may be slightly greater than thickness 301 because the amount of lithium ions exceeds the amount of space within the voids of buffer layer 104. In other embodiments, buffer layer 104 may be made thicker to fully accommodate or nearly fully accommodate the lithium ions when the battery cell is fully charged.

During discharge, the lithium ions migrate away from anode current collector 105 to cathode layer 102 through solid-state electrolyte layer 103. Once all or most of the lithium ions have migrated, discharged state 310 may again be present. The swelling caused by the lithium ions plating subsides and the thickness of buffer layer 104 returns to approximately thickness 302. Similarly, the thickness of the battery cell may return to thickness 301. The amount of swelling when buffer layer 104 is present may be significantly less than if buffer layer 104 was not present and lithium ions were permitted to plate on anode current collector 105 without a porous buffer being present.

Figure 4:
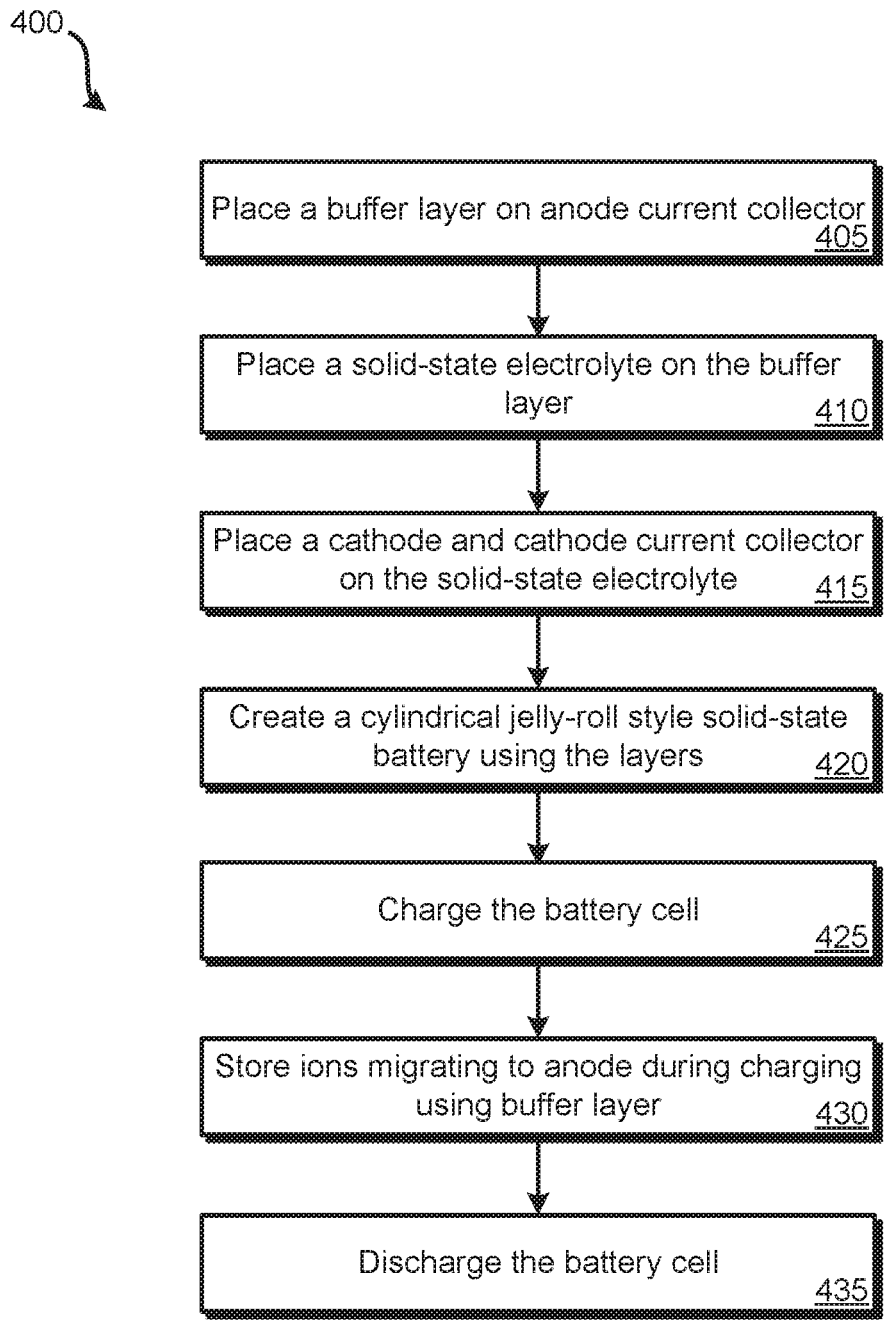
FIG. 4 illustrates an embodiment of a method for creating a battery cell that exhibits a decreased amount of swelling.

Various methods may be performed to create a battery cell having an ion (e.g., lithium ion) buffer layer against the anode current collector of a SSB. FIG. 4 illustrates an embodiment of a method 400 for decreasing swelling of a battery cell when charged. At block 405, an anode current collector layer may be created. This anode current collector layer may be a copper foil or some other form of conductive, flexible layer; such as Ni, Fe, Ni+Fe, carbon fiber sheet, etc. The SSB may be an "anode-free" SSB, therefore the anode current collector may function as both the anode and the anode current collector. At block 405, a buffer layer may be created on the anode current collector. For instance, carbon particles may be deposited onto the anode current collector foil. The layer of carbon may be between 100 nm and 30 µm thick.

At block 410 a solid-state electrolyte layer may be placed or deposited onto the buffer layer. At block 415, a cathode and cathode current collector may be placed or deposited onto the solid-state electrolyte layer. In some embodiments, a first group of layers that includes the anode current collector and buffer layer may be created. A second group of layers that includes the cathode current collector, cathode, and solid electrolyte layer may be created. The two groups of layers may then be layered together. In other embodiments, the solid electrolyte layers is included the in the first group of layers rather than the second or instead may be layered between the two groups when the battery cell is assembled.

At block 420, a cylindrical jelly-roll style solid-state battery may be created by rolling the layers together. The resulting cylindrical jelly-roll may be inserted into a cylindrical housing, such as a cylindrical canister, for storage. Electrical leads to the current collectors may be connected to terminals of the battery cell.

At block 425, the battery cell may be charged. The charging results in lithium ions migrating from the cathode toward the anode current collector. At block 430, the ions are stored within the voids of the buffer layer that is immediately adjacent to the anode current collect. Since voids of a layer that is already present are being filled by the ions, the battery may swell significantly less than if the buffer layer was not present.

At block 435, the battery may be discharged. The discharge may cause ions to move through the solid-state electrolyte to the cathode. Therefore, the voids within the buffer layer may again be empty. Blocks 425 through 435 may repeat a large number of times. For instance, such as battery cell may be incorporated as part of a battery module of an electric vehicle.

As an example, a battery cell created account to blocks 405-420 may be charged with 7559 Ah. The battery cell may discharge 6229 Ah, for an initial Coulombic efficiency of 82.4%. This battery may experience a radial volume expansion of about 86%.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An anode-free solid-state battery cell, comprising:
a cathode current collector layer;
a cathode, that is layered with the cathode current collector layer;
a solid-state electrolyte layer;
a lithium ion buffer layer, wherein:
the solid-state electrolyte layer is located between the cathode and the lithium ion buffer layer;
the lithium ion buffer layer is porous;
the lithium ion buffer layer is in direct contact with the solid-state electrolyte layer; and
an anode current collector that is in direct contact with the lithium ion buffer layer, wherein, when charged, lithium ions plate on the anode current collector and are stored within the lithium ion buffer layer.

2. The anode-free solid-state battery cell of claim 1, wherein the lithium ion buffer layer is electrically conductive and sufficiently flexible for the anode-free solid-state battery cell to be rolled into a jelly-roll style battery cell.

3. The anode-free solid-state battery cell of claim 2, wherein the anode current collector is a copper foil layer.

4. The anode-free solid-state battery cell of claim 3, further comprising a cylindrical battery cell housing, wherein the cathode current collector layer, the cathode, the solid-state electrolyte layer, the lithium ion buffer layer, and the anode current collector are rolled together to form a jell-roll style anode-free solid-state battery cell and inserted within the cylindrical battery cell housing.

5. The anode-free solid-state battery cell of claim 4, wherein the lithium ion buffer layer is less than 20 µm thick.

6. The anode-free solid-state battery cell of claim 5, wherein the lithium ion buffer layer is graphite.

7. The anode-free solid-state battery cell of claim 4, wherein the anode-free solid-state battery cell has a power density of at least 1000 Watt-hours per liter.

8. The anode-free solid-state battery cell of claim 4, wherein the anode-free solid-state battery cell has an energy density of at least 400 Watt-hours per kilogram.

9. The anode-free solid-state battery cell of claim 4, wherein, when the anode-free solid-state battery cell is fully charged at least 80% of the lithium ions that have migrated toward the anode current collector through the solid-state electrolyte layer are stored within the lithium ion buffer layer.

10. The anode-free solid-state battery cell of claim 4, wherein the porosity of the lithium ion buffer layer is greater than 70%.

11. A method for creating an anode-free battery cell, the method comprising:
  placing a lithium-ion buffer layer directly on an anode current collector, wherein:
    the lithium ion buffer layer is porous; and
    when charged, lithium ions plate on the anode current collector and are stored within the lithium ion buffer layer;
  placing a solid-state electrolyte layer directly against the lithium ion buffer layer;
  placing a cathode against the solid-state electrolyte layer; and
  placing a cathode current collector against the cathode.

12. The method for creating the anode-free battery cell of claim 11, wherein the lithium ion buffer layer is electrically conductive and sufficiently flexible for the anode-free battery cell to be rolled into a jelly-roll style battery cell.

13. The method for creating the anode-free battery cell of claim 12, further comprising:
  creating a cylindrical jelly-roll style solid-state battery by rolling the anode current collector, the lithium ion buffer layer, the solid-state electrolyte layer, the cathode, and the cathode current collector together.

14. The method for creating the anode-free battery cell of claim 13, further comprising:
  charging the battery cell; and
  storing lithium ions migrating toward the anode current collector using the buffer layer.

15. The method for creating the anode-free battery cell of claim 14, wherein the lithium ion buffer layer is less than 20 µm thick.

16. The method for creating the anode-free battery cell of claim 15, wherein the lithium ion buffer layer is graphite.

17. The method for creating the anode-free battery cell of claim 16, wherein the anode-free solid-state battery cell has a power density of at least 1000 Watt-hours per liter.

18. The method for creating the anode-free battery cell of claim 17, wherein the anode-free solid-state battery cell has an energy density of at least 400 Watt-hours per kilogram.

19. The method for creating the anode-free battery cell of claim 18, wherein, when the anode-free solid-state battery cell is fully charged at least 80% of the lithium ions that have migrated toward the anode current collector through the solid-state electrolyte layer are stored within the lithium ion buffer layer.

20. The method for creating the anode-free battery cell of claim 19, wherein the anode current collector is a copper foil layer.

* * * * *